2,837,540
EXTRACTION OF STEROLS

Henry J. Buehler, St. Louis, Mo., assignor to Anheuser-Busch, Inc., St. Louis, Mo., a corporation of Missouri No Drawing. Application September 28, 1954
Serial No. 458,947

7 Claims. (Cl. 260—397.25)

The present invention relates generally to the extraction of sterols from yeast, molds and other plant and animal products, and more particularly to a novel method for the extraction and isolation of sterols, particularly ergosterol, from yeast.

An object of the present invention is to provide a novel process for extracting and recovering sterols, and particularly ergosterol, from fungoid organisms and like sources, in a relatively pure form and with the attainment of high yields. More particularly, it is an object to provide a relatively simple and economical method for extracting ergosterol from yeast with an attainment of higher yields than previously accomplished, employing normal butyl alcohol as a solvent.

Further objects and advantages will be readily apparent from the following detailed description.

Briefly, the method includes the steps of hydrolyzing the fungoid organism to effect a separation of the lipid substances, treating said substances with an alkali dissolved in an aliphatic alcohol having from four to six carbon atoms, so as to simultaneously saponify the conjugates and dissolve the sterols—followed by a concentration of the liquid, crystalization of the sterols, and removal of the sterols from the liquid.

As is well known in the art, the sterols are lipid substances which are characterized by the fact that they are unsaponifiable neutral compounds. Previous methods for extracting these substances from naturally occurring materials have utilized either a direct extraction with some suitable solvent, followed by saponification and one or more extraction steps, or a direct saponification followed by one or more extraction steps whereby the sterols are separated from the saponified mass.

According to the present invention, the material such as yeast containing the sterols is subjected to a preliminary hydrolysis in an aqueous medium for the purpose of removing the great mass of undesirable water-soluble and saponifiable material.

The water insoluble residue is removed, as by filtering, and is then subjected to the action of a saponifying agent dissolved in an organic solvent which is only partially miscible with water.

The solution is then concentrated to a small volume to which is added ten or more volumes of water to dissolve the solvent and to crystalize the esterols in a relatively high degree of purity.

Although the materials, concentrations, temperatures and times of treatment may be varied somewhat, as will be readily understood by one skilled in the art, a preferred method of carrying out the process which is the subject matter of the present invention is set forth below, in which the parts are given by weight.

A slurry containing 100 parts of dry weight of yeast at a 10% concentration is adjusted to pH 13 by the addition of sodium hydroxide, and the mixture heated under about 20 pounds steam pressure for thirty minutes with constant stirring. This hydrolyzes much of the protein and fatty matter and releases the sterols in both the free and chemically combined forms. This initial hydrolysis should not be carried too far, otherwise the mass becomes too gelatinous and is difficult to filter and work.

Ten parts of a filter aid such as "Dicalite" or "Celite" are added to the slurry, and the solid residue is filtered off and washed with water. This step removes the water soluble material and much of the saponifiable material.

The water insoluble residue which contains the sterols is then introduced into 500 parts of a 7% solution of sodium hydroxide in an aliphatic alcohol containing from four to six carbon atoms, preferably normal butyl alcohol, and the mixture is refluxed at atmospheric pressure for one hour. This step thoroughly saponifies the sterol conjugates and simultaneously extracts the free sterols.

The initial hydrolysis with sodium hydroxide at pH 13.0 causes the sterol conjugates to be more susceptible to the saponifying agent, thereby permitting a more efficient extraction of the sterols by the butyl alcohol.

In addition to butyl alcohol, either amyl or hexyl alcohol can be used. It is advantageous to use an aliphatic alcohol containing from four to six carbon atoms, and preferably four, i. e., butyl alcohol, because of its limited solubility in water. Specifically, it is desirable to have a solvent which is not too soluble in water so that it is available to dissolve the sterols. On the other hand, the solvent should not be too insoluble in water, otherwise too much water would be required to dissolve the alcohol in the crystallization step, which will be described more fully hereinafter.

The mixture which contains the yeast debris, the sterols, the sodium hydroxide and the butyl alcohol is then filtered, the residue washed with a small quantity of butyl alcohol, and the filtrate and washings containing the dissolved sterols concentrated to 25 parts, as by distillation. Normal butyl alcohol has a further advantage over either amyl or hexyl alcohol in this step because it has a lower boiling point and is therefore more easily removed.

Ten to twenty volumes of hot water are then added to the concentrate, and the mixture heated at 80° to 90° C. for 30 minutes, and then allowed to cool to about 25° C. for several hours. As commented on above, when either amyl or hexyl alcohol is used as a solvent, more water is required to dissolve the alcohol and consequently larger tanks are required.

Upon cooling, the sterols crystallize out and are filtered off, washed with water, and dried in any conventional manner.

The resultant product is a white crystalline mass which is substantially 100% sterols, of which about 90% is ergosterol.

It is to be understood that the foregoing description has been given only by way of illustration and example, and that alterations and changes in the present disclosure, which will be readily apparent to one skilled in the art, are contemplated as within the scope of the present invention which is limited only by the claims which follow.

What is claimed is:

1. The method of extracting sterols from fungoid organisms containing lipid substances, including the steps of partially hydrolyzing the fungoid organism with an aqueous solution of an alkali; filtering and treating the residue with an alkali dissolved in an aliphatic alcohol having from four to six carbon atoms to simultaneously saponify the conjugates and extract the sterols; removing the solid residue; adding sufficient water to the remaining liquid to precipitate the sterols; and separating the precipitated sterols from the liquid.

2. The method of extracting sterols from fungoid organisms containing lipid substances, including the steps of partially hydrolyzing the fungoid organism with an aqueous solution of an alkali; filtering and treating the residue with an alkali dissolved in butyl alcohol to simultaneously saponify the conjugates and extract the sterols; removing the solid residue; adding sufficient water to the remaining liquid to precipitate the sterols; and separating the precipitated sterols from the liquid.

3. The method of extracting sterols from yeast, including the steps of partially hydrolyzing the yeast with a weak aqueous solution of sodium hydroxide; filtering, and treating the residue with sodium hydroxide dissolved in butyl alcohol to simultaneously saponify the conjugates and extract the sterols; removing the solid residue; adding sufficient water to the remaining liquid to precipitate the sterols; and separating the precipitated sterols from the liquid.

4. The method of extracting sterols from yeast, including the steps of partially hydrolyzing the yeast with a weak aqueous solution of sodium hydroxide; filtering, and treating the residue with sodium hydroxide dissolved in butyl alcohol to simultaneously saponify the conjugates and extract the sterols; removing the solid residue; concentrating the remaining liquid; adding between about ten to twenty volumes of hot water and heating at about 80° to 90° C. for about 30 minutes; cooling to about 25° C. for several hours to precipitate the sterols; and separating the precipitated sterols from the liquid.

5. The method of extracting sterols from yeast, including the steps of treating the yeast with an aqueous solution of an alkali at a pH of about 13; removing the filtrate; treating the residue with an alkali dissolved in butyl alcohol to simultaneously saponify the conjugates and extract the sterols; removing the solid residue; concentrating the remaining liquid; adding sufficient water to the liquid to precipitate the sterols; and separating the precipitated sterols from the liquid.

6. A method of extracting sterols from lipid substances obtained from a fungoid organism, which includes the steps of partially hydrolyzing the fungoid organism with an aqueous solution of an alkali, recovering the lipid substances, and treating said lipid substances with an alkali dissolved in an aliphatic alcohol having from four to six carbon atoms, in the presence of water, to simultaneously saponify the conjugates and extract the sterols.

7. A method of extracting sterols from lipid substances obtained from yeast, which includes the steps of partially hydrolyzing the fungoid organism with an aqueous solution of an alkali, recovering the lipid substances, and treating said lipid substances with sodium hydroxide dissolved in butyl alcohol, in the presence of water, to simultaneously saponify the conjugates and extract the sterols.

References Cited in the file of this patent

UNITED STATES PATENTS

| | | |
|---|---|---|
| 2,223,398 | Bennett | Dec. 3, 1940 |
| 2,280,815 | Fernholz | Apr. 28, 1942 |
| 2,598,269 | Kirschenbauer | May 27, 1952 |
| 2,648,687 | Van Ness | Aug. 11, 1953 |
| 2,715,638 | Albrecht | Aug. 16, 1955 |
| 2,730,536 | Feeney | Jan. 10, 1956 |